Patented Oct. 31, 1950

2,528,349

UNITED STATES PATENT OFFICE 2,528,349

ALKALINE SULFITE DIGESTION OF HARDWOOD

Eduard Farber, Washington, D. C., assignor, by mesne assignments, to Hardwood By-Products, Inc., a corporation of Delaware No Drawing. Application February 27, 1945, Serial No. 580,084

3 Claims. (Cl. 92—13)

My invention relates to the production of cellulosic pulp for chemical and industrial uses, and also to the production of fibrous bodies, for example fiber board, fiber blocks, etc.

As its basic raw materials my process can use quite or substantially any of the products of plant life, but the process is particularly adapted to use those plant products which contain considerable quantities of the hemi-celluloses, or considerable quantities of extractives, or both, using the term "hemi-celluloses" in a broad generic sense. It has the characteristic that it requires a smaller quantity of reagents than prior processings and simpler apparatus, and under certain conditions provides for the direct utilization of the substance of hemi-celluloses, extractives and lignin. Many wastes and by-products of the processing of wood and farm products are suitable raw materials for the process, although my invention is not limited to the use of wastes and by-products as appears hereafter.

Briefly, the process of producing pulp of my invention consists of treating the raw materials with an alkali and with an alkaline salt of sulfurous acid, and at least for the production of some compositions when desired, thereafter, precipitating at least some of the dissolved matters. By the precipitation I recover, in a usable form but probably not in its initial natural form, at least some of the lignin that is dissolved in the reaction, and perhaps recover also the substance of some other constituents of the raw material dissolved during the reaction. The pulp resulting directly from the reaction, i. e. not counting the possible precipitate, is substantially an extracted cellulose containing less than the initial quantity of lignin. Even with the addition of the precipitate the pulp is at least mostly extracted cellulose. In both instances the pulp can be used for quite or substantially all the purposes served by extracted cellulose; for example in both instances the pulp can be acetated, nitrated, etc., producing actually or in effect cellulose acetate, cellulose nitrate, and other cellulose derivatives. Supplemental materials, e. g. sizing, can be added to the mixture if desired. Fiber board and other fiber products can be made from the reacted mixture directly if desired.

As before indicated, the raw material of my process may be substantially any form of plant material, but it is particularly suited to utilize those plant materials which contain a considerable quantity of the hemi-celluloses, or considerable extractives, or both. Especially suitable are those cellulosic materials that are rich in pentosans, such as hard wood, seed hulls, and stalks. These materials are taken, at least usually, sufficiently long after harvesting to have permitted the escape of their original moisture, but they may be used either dry or wetted from exposure as they may be available, and in substantially any condition as long as the original fiber has not been substantially destroyed or disintegrated. The proportions stated hereafter however are based on the dry weight of the raw material. Preferably the raw material is employed in the form of chips, shavings or other relatively small pieces in order that the alkali and sulfite may be brought into intimate contact with the whole mass of raw material both quickly and uniformly.

The alkali with which the raw material is treated may be any of the alkalies, for example and at present preferably, sodium hydroxide. Mixtures of alkalies can be used. The alkali is used in solution, e. g. dissolved in water. The possible proportions of alkali extend over a considerable range. Speaking generally, the greater the quantity of extractive materials, for example of the tannic type, present in the raw material, and the greater the quantity of coloring matter in the raw material and the greater the extent to which the removal of coloring matter is desired, the greater may be the concentration of the alkali solution. Also within certain limits the higher the alkali concentration, the greater is the quantity of lignin-like substances dissolved, and the more rapid is the defibering action and the greater is the attack of the alkali on the cellulose fibers. Speaking generally, the attack on the cellulose fibers is undesirable. For the present purpose, one (1) part of alkali to one hundred (100) parts of the total water present in the reacting mass, by weight, will usually be at least sufficient. On the other hand as little as one-fiftieth ($1/50$) of one (1) part of alkali to one hundred (100) parts of the water may be found sufficient in cases of easily defiberized materials of low natural acidity. Generally the speed of the reaction and the extent of defibering is more satisfactory when at least one-tenth ($1/10$) of one (1) part of alkali is used with each one hundred (100) parts of the water, by weight. Usually I use about one-half ($1/2$) of one (1) part of alkali to each one hundred (100) parts of the water.

The sulfite employed may be any of the alkaline salts of sulfurous acid, for example and at present preferably, sodium sulfite. Mixtures of alkaline sulfites can be used. The sulfite tends to speed the removal of any extractive matters present in the plant material, prevent excessive swelling of the fibrous materials, and facilitate the separation of the fibrous materials from the liquid in which they are suspended at the end of the reaction or reactions. The possible quantity of sulfite, proportionate to the quantity of water in the reacting mass, extends over a considerable range. The effect of low concentrations of the sulfite (for instance, one-fiftieth ($1/50$) of one (1) part to one hundred (100) parts of the water, by weight, is more pronounced with dilute solutions of the alkali than with higher concentrations of the alkali, speaking generally. However sulfite in quantities exceeding one (1) part to each one hundred (100) parts of the water, by weight, are undesirable usually because of a secondary salting-out of some of the high molecular extractives. Usually one-half ($1/2$) of one (1) part of sulfite to each one hundred (100) parts of the water, by weight, is satisfactory.

For convenience I usually dissolve both the alkali and sulfite in whatever quantity of solvent, e. g. water, is to be added to the plant material to form the reaction mass, although they may be dissolved in a smaller quantity of solvent and in such a smaller body of solution incorporated in the reaction mixture. However it is not necessary to treat the plant material with both reagents simultaneously. For example, the raw material can first be treated with a solution of alkali until a partial solution of hemi-celluloses, etc. is effected and then the solids of such reaction separated from the reacted liquid and those solids treated with a solution of the sulfite. Contrariwise, the raw material can be treated first with a solution of the sulfite, until most of the extractives and coloring matter are removed, and thereafter the solids of that reaction separated out and then treated with another solution containing the alkali. Or as another procedure, the raw material can first be treated with a solution of the alkali (or sulfite) alone and thereafter the sulfite (or alkali) added to the reacting or reacted mixture.

The quantity of water employed also can vary widely since, primarily, its purposes are to act as a vehicle for the diffusion of the alkali and sulfite through the raw material, to provide a liquid phase in which the reaction or reactions take place, and to provide a solvent for reaction products of the hemi-celluloses and/or lignin. I prefer at least sufficient water to form a flowing mixture with the raw material, and usually more than that. Ten (10) parts of water to one (1) part of the raw plant material, by weight, is quite satisfactory, but much larger or much smaller quantities can be used.

The reaction takes place at room temperature. However applying heat to hold the mixture at a higher temperature speeds the reaction. Temperatures up to the boiling point of the water solution, at atmospheric pressure, can be used. However I prefer temperatures less than the possible maximum; by preference not greater than 50° C. Usually I use about 40° C. Higher temperatures, and especially prolonged boiling, tend to bring about attacks on extracted matters, and perhaps other reactions in the solution, that lead to secondary precipitation and resultant contamination of the pulp product.

Agitation of the mass during the reaction is desirable to maintain the constituents of the reacting mass well mixed. The reaction can be carried out in various equipment, including rod mills, double arm mixers, roller mills and beaters.

Speaking generally, the reaction or reactions with the alkali and sulfite is or are continued until the hemi-celluloses and/or lignin are converted to such an extent as may be desired in any particular instance and most of the extractives and coloring matters are removed, subject to the limitation that the reaction is not continued to the point where the cellulose is attacked to an undesirable extent. In ordinary cases when the alkali and sulfite are used simultaneously the reaction may be continued until the initial lignin content is reduced to some value that is satisfactory for the particular purpose for which the pulp product is to be used. For example, in the manufacture of fiber board the greater the quantity of unaffected lignin left in the mixture after the reaction, the more brittle tends to be the fiber board. When making fiber board accordingly, the reaction may be continued until the quantity of unaffected lignin is too small to make the fiber board undesirably brittle, and this is a sufficient indication of the time that the reaction may be brought to an end. For some purposes at least, the reaction can be brought to an end when as much as one-half or one-third of the initial quantity of lignin remains in the mixture unaffected.

If the reacted mixture contains any splinters or other undesirably large particles as the time approaches to end the reaction, usually I screen them out as the next step. However any necessary separation of unduly large particles from the pulp can be postponed to a later time if desired, e. g. until after the precipitation discussed below, or even until after the pulp has been separated from the liquid of the reaction.

The foregoing completes the preparation of what may be called the primary pulp, and, for example, this primary pulp now can be separated from the liquid, as by screening or filtering, etc., and dried if and as desired, etc., and used for any of the various purposes served by cellulosic pulp.

However as before suggested (considering especially the case where the alkali and the sulfite are employed simultaneously), the liquid of the reacted mixture carries in solution substances of the basic raw materials (notably the dissolved hemi-celluloses and lignin) that themselves are usable. These may be recovered by evaporation of the liquid, e. g. after the separation of the primary pulp from the liquid. On the other hand, they can be recovered readily by precipitation, e. g. by adding an acid or acids to the liquid of the reaction until a pH of from about 4 to about 5 is achieved. Any convenient acid can be used for this purpose. The substances recoverable by precipitation by acids are the substances of such materials as pentosans, hexosans and lignin, admixed with certain extractives. These have special characteristics that adapt them for use with cellulose in various of the uses of the latter. For example, such precipitates added to cellulose used in the manufacture of fiber board, increases the strength of the board. Where these precipitable substances and the contemplated uses are such that the precipitates can be used with the primary pulp, I preferably recover them by precipitation before separating the primary pulp from the liquid of the mixture, with the result that a single operation of separating solids from the liquid of the reactions serves to take out both the primary pulp and the recovered dissolved matters. In precipitating the dissolved matters in the presence of the primary pulp I usually take care, by stirring and devoting sufficient time to the operation, to bring about equilibrium between the absorbed and the free liquid of the mixture at the desired pH value. Should the purposes for which the primary pulp is to be such that the potential precipitate would be an undesire contamination, the primary pulp can be separated from the reaction liquid prior to any precipitation of course, and thereafter the precipitables precipitated for other uses, so far as may be desired.

Further, however, either with or without the foregoing precipitation the solids and potential solids of the reacted mixture can be treated or supplemented in various ways before separation from the liquid containing them. Thus if desired, for example, a size may be added to the reacted mixture if the solids are to be used for making fiber board or another fiber product. For example, a small quantity of an emulsion of a protein, such as about one-fifth (⅕) of one (1) part of casein to one hundred (100) parts of the plant raw material, by weight, in the form of an alkaline emulsion, may be added to the reacted mixture, the emulsion being stirred into the mixture in order to secure good distribution. However other sizing materials can be used, either as alternatives for or in addition to that mentioned, as will be understood; for example, from one (1) to five (5) parts of wood rosin to one hundred (100) parts of the initial plant raw material, by weight, can be used instead of the casein, this being added to the reacted mixture in, say, the form of a soap before acidifying the mixture, and precipitated by acidifying the mixture. When sizing materials are used, usually I precipitate soluble matters from the liquid of reaction, by acidifying as mentioned above, after the addition of the sizing material or materials, rather than before the addition of the sizing material or materials. The addition of a proteinaceous material like casein, e. g. as described above, increases the quantity of dissolved matter precipitated by acid, and has the further advantage that the effluent obtained in filtration is purer and therefore more easily disposed of. For the most part at least the sizing material not only comes out of the liquid of the reaction along with the solids of the reaction or reactions when these are separated from the liquid, but actively combines with them in increase their precipitable quantity and filterability. Such further treatments are not limited to the addition of supplementing materials such as sizing however. For example if the pulp is to be subjected to some chemical reaction that can take place satisfactorily in the presence of the liquid of the reaction of my process, of course such further operation may be carried out in the mixture resulting from my process and, for example, the derivative of such further reaction, rather than the pulp which preceded it, separated from the liquid suspending it.

In the event that a fiber board is desired, the mixture of the reaction of my process, and say after the addition of size and precipitation as above described, may be run through, for example, a conventional type of machine for making paper board from fibrous pulp, the liquid of the reacting mixture being mostly screened out in that operation as will be understood. Obviously other shapes can be formed analogously. As another alternative, articles of various shapes can be made by introducing the fluid mixture of the reaction into molds having drains for the liquid, and applying pressure to expel residual liquid to the desired extent. Threads and wires can be embedded in the ultimate articles to reinforce them if desired, and generally other practices of fiber board, fiber blocks, etc. can be employed as will be apparent.

The following are specific examples of my process:

*Example 1.*—100 pounds of a mixture of broken vegetable stalks, e. g. grain stalks or the like, air dried as normally available, are mixed with 1,000 pounds of a water solution containing 5 pounds of sodium hydroxide and 5 pounds of sodium sulfite. The mass is treated in a ball mill (which agitates it thoroughly and continuously of course) at about 40° C. for 3 hours. Any undesirably large particles are then screened out. The mixture is then run over a screen fine enough to retain the solids of the mixture while permitting the escape of the liquid of the mixture. These solids are then dried, e. g. by air with or without heat.

*Example 2.*—100 pounds of a mixture of small hard wood chips are mixed with 1,000 pounds of a water solution containing 5 pounds of sodium hydroxide and 5 pounds of sodium sulfite. The mass is treated in a rod mill (where it is stirred constantly and continuously) at about 40° C. for 3 hours. Any splinters and other undesirably large particles that may be found in the mixture are then screened out. 2 pounds of casein in a common form of alkaline emulsion is then stirred into the reaction mixture, care being taken to distribute the casein well throughout the pulp mixture. Dilute sulfuric acid (say about twenty (20) per cent acid) is then stirred into the mixture in sufficient quantity to yield a pH reading of about 5 after equilibrium between the absorbed and the free liquid in the mass has been reached. This precipitates substances taken into solution and adds them to the mass of solids. The resultant mixture is then run through a common form of paper board machine. Therein the liquid of the mixture is separated out, and fiber board is produced from the solids.

It will be understood of course that boards, blocks, etc. obtained from the pulp of my process can be further treated as may be desired, e. g. by bleaching, by sizing, etc. Also waterproofing or water resistant ingredients can be added if desired. The board, blocks, etc. can be glued and printed on in the usual way, and in general treated in the same manner as conventional fiber board.

It will be understood that my invention is not limited to the details of operation and the specific materials mentioned above, except as may hereafter appear in the claims.

All proportions mentioned hereafter in the claims are by weight.

I claim:

1. A process for extracting hemicelluloses, lignin, pentosans and similar bonding agents from hardwood to produce a pulp which consists essentially of subjecting at atmospheric pressure and at a temperature of about 40° C. hardwood particles to the action of an aqueous solution consisting essentially of about 0.5% by weight of both sodium hydroxide and sodium sulfite.

2. A process for extracting hemicelluloses, lignin, pentosans and similar bonding agents from hardwood to produce a pulp which consists essentially of subjecting at atmospheric pressure and at a temperature of about 40° C. hardwood particles to the action of an aqueous solution consisting essentially of about 0.5% by weight of both an alkali metal hydroxide and an alkali metal sulfite.

3. A process for extracting hemicelluloses, lignin, pentosans and similar bonding agents from hardwood to produce a pulp which consists essentially of subjecting at atmospheric pressure and at a temperature of about 40° C. for about three hours, hardwood particles to the action of an aqueous solution consisting essentially of from about 0.02% to about 1.0% by weight in approximately equal proportions of both sodium hydroxide and sodium sulfite.

EDUARD FARBER.

REFERENCES CITED

The following references are of record in the file of this patent:

UNITED STATES PATENTS

| Number | Name | Date |
|---|---|---|
| 66,338 | Heaton | July 2, 1867 |
| 1,389,936 | Clapp | Sept. 6, 1921 |
| 1,501,925 | Shaw | July 22, 1924 |
| 1,631,834 | Schorger | June 7, 1927 |
| 1,654,624 | Wells | Jan. 3, 1928 |
| 1,682,834 | Dedrich | Sept. 4, 1928 |
| 1,846,511 | Darling | Feb. 23, 1932 |
| 1,859,848 | Rue | May 24, 1932 |
| 1,873,056 | Smith | Aug. 23, 1932 |
| 1,936,697 | Traquair | Nov. 28, 1933 |
| 2,188,533 | Drewsen | Jan. 30, 1940 |
| 2,247,204 | Schorger | June 24, 1941 |
| 2,292,390 | Meiler | Aug. 11, 1942 |

FOREIGN PATENTS

| Number | Country | Date |
|---|---|---|
| 54,042 | Norway | June 11, 1934 |

OTHER REFERENCES

Chemistry of Pulp and Paper Making by Sutermeister, 3d edition (1941), published by John Wiley and Sons, Inc., New York, pages 255–260.

Paper Trade Journal, Mar. 5, 1927, pages 56 and 57.